US008836719B2

(12) United States Patent
Leung et al.

(10) Patent No.: US 8,836,719 B2
(45) Date of Patent: Sep. 16, 2014

(54) CRAFTING SYSTEM IN A VIRTUAL ENVIRONMENT

(75) Inventors: Felix Leung, Toronto (CA); Karl Joseph Borst, Woodbridge (CA); Joseph Benjamin Ganetakos, Toronto (CA)

(73) Assignee: Ganz, Woodbridge, Ontario ( * ) Notice: Subject to any disclaimer, the term of this patent is extended or adjusted under 35 U.S.C. 154(b) by 608 days.

(21) Appl. No.: 13/091,816

(22) Filed: Apr. 21, 2011

(65) Prior Publication Data

US 2011/0261071 A1 Oct. 27, 2011

Related U.S. Application Data

(60) Provisional application No. 61/327,214, filed on Apr. 23, 2010.

(51) Int. Cl.
G09G 5/00 (2006.01)
G06Q 10/00 (2012.01)

(52) U.S. Cl.
CPC ..................................... G06Q 10/00 (2013.01)
USPC ........................................ 345/619; 345/633

(58) Field of Classification Search
CPC combination set(s) only.
See application file for complete search history.

(56) References Cited

U.S. PATENT DOCUMENTS

| 5,056,019 | A | 10/1991 | Schultz |
| 5,890,963 | A | 4/1999 | Yen |
| 5,923,330 | A | 7/1999 | Tarlton |
| 5,926,179 | A | 7/1999 | Matsuda et al. |
| 5,956,038 | A | 9/1999 | Rekimoto |
| 5,971,855 | A | 10/1999 | Ng |
| 6,009,458 | A | 12/1999 | Hawkins et al. |
| 6,173,267 | B1 | 1/2001 | Cairns |
| 6,227,931 | B1 | 5/2001 | Shackelford |
| 6,251,017 | B1 | 6/2001 | Leason et al. |

(Continued)

FOREIGN PATENT DOCUMENTS

| CA | 2552367 A1 | 7/2005 |
| GB | 2365364 | 2/2002 |

(Continued)

OTHER PUBLICATIONS

Grace, "Web Site Tycoon's Next Goal: Sixth Grade"; Woonsocket Call, Jun. 19, 2002.

(Continued)

*Primary Examiner* — Kee M Tung
*Assistant Examiner* — Leon T Cain, II
(74) *Attorney, Agent, or Firm* — Pearne & Gordon LLP

(57) ABSTRACT

A crafting system and method are provided that allow users or players in a social virtual environment to create their own unique virtual items for use on the site. With the crafting system and method, players can collect different types of materials, some more common than others, from within the virtual social environment to customize items, which the player can use to express their individuality as well as sell or trade within the environment. The complexity and uniqueness of the crafted item makes it much more difficult for another player to obtain the same materials and to replicate the design.

40 Claims, 15 Drawing Sheets

(56) References Cited

U.S. PATENT DOCUMENTS

| | | |
|---|---|---|
| 6,253,167 B1 | 6/2001 | Matsuda et al. |
| 6,267,672 B1 | 7/2001 | Vance |
| 6,273,815 B1 | 8/2001 | Stuckman |
| 6,343,990 B1 | 2/2002 | Rasmussen |
| 6,347,995 B1 | 2/2002 | Igarashi |
| 6,352,478 B1 | 3/2002 | Gabai et al. |
| 6,389,375 B1 | 5/2002 | Thomsen et al. |
| 6,394,872 B1 | 5/2002 | Watanabe |
| 6,468,155 B1 | 10/2002 | Zucker et al. |
| 6,494,762 B1 | 12/2002 | Bushmitch et al. |
| 6,539,400 B1 | 3/2003 | Bloomfield et al. |
| 6,554,679 B1 | 4/2003 | Shackelford et al. |
| 6,609,968 B1 | 8/2003 | Okada et al. |
| 6,663,105 B1 | 12/2003 | Sullivan et al. |
| 6,692,360 B2 | 2/2004 | Kusuda et al. |
| 6,719,604 B2 | 4/2004 | Chan |
| 6,720,949 B1 | 4/2004 | Pryor et al. |
| 6,729,934 B1 | 5/2004 | Driscoll et al. |
| 6,739,941 B1 | 5/2004 | Brownsberger |
| 6,758,746 B1 | 7/2004 | Hunter et al. |
| 6,772,195 B1 | 8/2004 | Hatlelid et al. |
| 6,773,325 B1 | 8/2004 | Mawle et al. |
| 6,773,344 B1 | 8/2004 | Gabai et al. |
| 6,800,013 B2 | 10/2004 | Liu |
| 6,910,186 B2 | 6/2005 | Kim |
| 6,954,728 B1 | 10/2005 | Kusumoto et al. |
| 6,959,166 B1 | 10/2005 | Gabai et al. |
| 7,012,602 B2 | 3/2006 | Watson et al. |
| 7,037,166 B2 | 5/2006 | Shrock et al. |
| 7,054,831 B2 | 5/2006 | Koenig |
| 7,066,781 B2 | 6/2006 | Weston |
| 7,092,899 B2 | 8/2006 | Simas et al. |
| 7,094,154 B2 | 8/2006 | Kellerman et al. |
| 7,139,796 B2 | 11/2006 | Rekimoto et al. |
| 7,171,154 B2 | 1/2007 | Fujisawa |
| 7,179,171 B2 | 2/2007 | Forlines et al. |
| 7,227,965 B1 | 6/2007 | Sutton |
| 7,288,028 B2 | 10/2007 | Rodriquez et al. |
| 7,314,407 B1 | 1/2008 | Pearson |
| 7,396,281 B2 | 7/2008 | Mendelsohn et al. |
| 7,425,169 B2 | 9/2008 | Ganz |
| 7,439,972 B2 | 10/2008 | Timcenko |
| 7,442,108 B2 | 10/2008 | Ganz |
| 7,465,212 B2 | 12/2008 | Ganz |
| 7,467,096 B2 | 12/2008 | Antonucci et al. |
| 7,480,597 B2 | 1/2009 | Clark et al. |
| 7,488,231 B2 | 2/2009 | Weston |
| 7,534,157 B2 | 5/2009 | Ganz |
| 7,548,242 B1 | 6/2009 | Hughes et al. |
| 7,568,964 B2 | 8/2009 | Ganz |
| 7,587,338 B2 | 9/2009 | Owa |
| 7,591,703 B2 | 9/2009 | Zielinski et al. |
| 7,596,473 B2 | 9/2009 | Hansen et al. |
| 7,604,525 B2 | 10/2009 | Ganz |
| 7,618,303 B2 | 11/2009 | Ganz |
| 7,645,178 B1 | 1/2010 | Trotto et al. |
| 7,677,948 B2 | 3/2010 | Ganz |
| 7,789,726 B2 | 9/2010 | Ganz |
| 7,843,471 B2 | 11/2010 | Doan et al. |
| 7,846,004 B2 | 12/2010 | Ganz |
| 7,862,428 B2 | 1/2011 | Borge |
| 8,130,219 B2 * | 3/2012 | Fleury et al. ............ 345/418 |
| 2001/0031603 A1 | 10/2001 | Gabai et al. |
| 2001/0037316 A1 | 11/2001 | Shiloh |
| 2001/0039206 A1 | 11/2001 | Peppel |
| 2002/0007313 A1 | 1/2002 | Mai et al. |
| 2002/0022523 A1 | 2/2002 | Dan et al. |
| 2002/0022994 A1 | 2/2002 | Miller et al. |
| 2002/0046109 A1 | 4/2002 | Leonard et al. |
| 2002/0090985 A1 | 7/2002 | Tochner et al. |
| 2002/0094851 A1 | 7/2002 | Rheey |
| 2002/0107073 A1 | 8/2002 | Binney |
| 2002/0143652 A1 | 10/2002 | Beckett |
| 2002/0147640 A1 | 10/2002 | Daniele |
| 2002/0169668 A1 | 11/2002 | Bank et al. |
| 2002/0198781 A1 | 12/2002 | Cobley |
| 2003/0018523 A1 | 1/2003 | Rappaport |
| 2003/0055984 A1 | 3/2003 | Shimakawa et al. |
| 2003/0220834 A1 | 11/2003 | Leung |
| 2004/0030595 A1 | 2/2004 | Park et al. |
| 2004/0043806 A1 | 3/2004 | Kirby |
| 2004/0053690 A1 | 3/2004 | Fogel et al. |
| 2004/0092311 A1 | 5/2004 | Weston |
| 2004/0093266 A1 | 5/2004 | Dohring |
| 2004/0143852 A1 | 7/2004 | Meyers |
| 2004/0189702 A1 | 9/2004 | Hlavac et al. |
| 2004/0193489 A1 | 9/2004 | Boyd et al. |
| 2004/0242326 A1 | 12/2004 | Fujisawa |
| 2004/0249710 A1 | 12/2004 | Smith |
| 2004/0259465 A1 | 12/2004 | Wright et al. |
| 2005/0043076 A1 | 2/2005 | Lin |
| 2005/0059483 A1 | 3/2005 | Borge |
| 2005/0071225 A1 | 3/2005 | Bortolin |
| 2005/0137015 A1 | 6/2005 | Rogers et al. |
| 2005/0177428 A1 | 8/2005 | Ganz |
| 2005/0192864 A1 | 9/2005 | Ganz |
| 2005/0222906 A1 | 10/2005 | Chen |
| 2005/0250415 A1 | 11/2005 | Barthold |
| 2005/0250416 A1 | 11/2005 | Barthold |
| 2006/0100018 A1 | 5/2006 | Ganz |
| 2006/0129458 A1 | 6/2006 | Maggio |
| 2006/0148567 A1 | 7/2006 | Kellerman et al. |
| 2006/0160594 A1 | 7/2006 | Brase |
| 2006/0234795 A1 | 10/2006 | Dhunjishaw et al. |
| 2006/0271433 A1 | 11/2006 | Hughes |
| 2006/0281555 A1 | 12/2006 | Kellerman et al. |
| 2006/0293103 A1 | 12/2006 | Mendelsohn |
| 2007/0033107 A1 | 2/2007 | Ubale et al. |
| 2007/0060368 A1 | 3/2007 | Cheng |
| 2007/0063997 A1 | 3/2007 | Scherer et al. |
| 2007/0073582 A1 | 3/2007 | Jung et al. |
| 2007/0082720 A1 | 4/2007 | Bradbury |
| 2007/0088656 A1 | 4/2007 | Jung et al. |
| 2007/0130001 A1 | 6/2007 | Jung et al. |
| 2007/0197297 A1 | 8/2007 | Witchey |
| 2007/0211047 A1 | 9/2007 | Doan et al. |
| 2007/0226062 A1 | 9/2007 | Hughes et al. |
| 2007/0253581 A1 | 11/2007 | Sutton |
| 2007/0262984 A1 | 11/2007 | Pruss |
| 2008/0009350 A1 | 1/2008 | Ganz |
| 2008/0009351 A1 | 1/2008 | Ganz |
| 2008/0032790 A1 | 2/2008 | Zielinski et al. |
| 2008/0039203 A1 | 2/2008 | Ackley et al. |
| 2008/0070690 A1 | 3/2008 | Van Luchene et al. |
| 2008/0109313 A1 | 5/2008 | Ganz |
| 2008/0111816 A1 * | 5/2008 | Abraham et al. ............ 345/420 |
| 2008/0134099 A1 | 6/2008 | Ganz |
| 2008/0146342 A1 | 6/2008 | Harvey |
| 2008/0163055 A1 | 7/2008 | Ganz |
| 2008/0176658 A1 | 7/2008 | Wright |
| 2008/0221998 A1 | 9/2008 | Mendelsohn et al. |
| 2008/0265509 A1 | 10/2008 | Gatzios |
| 2008/0280684 A1 | 11/2008 | McBride et al. |
| 2008/0288343 A1 | 11/2008 | Ho et al. |
| 2009/0029772 A1 | 1/2009 | Ganz |
| 2009/0053970 A1 | 2/2009 | Borge |
| 2009/0054155 A1 | 2/2009 | Borge |
| 2009/0063282 A1 | 3/2009 | Ganz |
| 2009/0131164 A1 | 5/2009 | Ganz |
| 2009/0204420 A1 | 8/2009 | Ganz |
| 2009/0204499 A1 | 8/2009 | Caswell |
| 2009/0313084 A1 | 12/2009 | Chugh |
| 2010/0030660 A1 | 2/2010 | Edwards |
| 2010/0041481 A1 | 2/2010 | Smedley et al. |
| 2010/0060662 A1 | 3/2010 | Law |
| 2010/0151940 A1 | 6/2010 | Borge |
| 2010/0174593 A1 | 7/2010 | Cao et al. |
| 2010/0197389 A1 | 8/2010 | Ueda |

(56) References Cited

U.S. PATENT DOCUMENTS

| | | |
|---|---|---|
| 2010/0210333 A1 | 8/2010 | Halash |
| 2011/0092128 A1 | 4/2011 | Ganz |
| 2011/0261071 A1* | 10/2011 | Ganetakos et al. ........... 345/619 |

FOREIGN PATENT DOCUMENTS

| | | |
|---|---|---|
| JP | 2002063092 | 2/2002 |
| WO | 01/02072 A1 | 1/2001 |
| WO | 01/33327 A1 | 5/2001 |
| WO | 2008/067668 A1 | 6/2008 |

OTHER PUBLICATIONS http://web.archive.org.web.20031202190119/www.monopets.com/, Dec. 2, 2003.

Real-Money Trade of Virtual Assets: Ten Different User Perceptions (Vili Lehdonvirta, 2005).

Virtual Economics: Applying Economics to the Study of Game Worlds (Vili Lehdonvirta, 2005).

* cited by examiner

PREVIEW: T-Shirt (In-Design)

T-Shirt (In-Design)
Crafting Rating: 23
Slots: 6
Quality: 23
Trade X
Set X

This T-Shirt can be Customized with Clothing Materials and worn.

Compatible with:
Radiances, Clothing Adornments, Dyes, Fabrics, Clothing Designs.

Contents of Crafted Item:
Shirt Pocket
Green Stripes
Argle Pattern
Purple Dye

Pins disappear, replaced by star-effect to indicate finished crafted item.

FIG. 13

CRAFTING SYSTEM IN A VIRTUAL ENVIRONMENT

CROSS-REFERENCE TO RELATED APPLICATION

This application claims the benefit of U.S. Provisional Application No. 61/327,214, entitled CRAFTING SYSTEM and filed on Apr. 23, 2010, the entirety of which is incorporated herein by reference.

FIELD OF THE INVENTION

This application relates generally to computer-based social environments. More specifically, this application relates to a crafting system and method that facilitates creating unique user-designed objects for virtual representations of real products in connection with a virtual environment.

BACKGROUND

Once primarily used for research and shopping, the Internet has quickly become an alternative source for entertainment, dating, and multi-player gaming. Through various types of websites, virtual communities have been established that allow users to create a virtual or online reality for themselves. Computer games have also crossed over into the online world, allowing users to play against or along with each other from the comfort of their own homes, Internet cafes or other Wi-Fi outlets around the world. When it comes to most online entertainment activities including gaming and virtual communities, a disconnection unfortunately exists between objects in the real world and objects in the virtual world.

Despite the popularity of such websites as well as similar computer games, consumers continue to demand more interactive capabilities and more flexibility with respect to their virtual products.

SUMMARY

The subject application involves a system and/or method which facilitate designing and creating new objects by users using materials, templates and other design techniques made available through a game or other online social environment.

According to an aspect, a computer system for crafting virtual items is provided. The system includes a server computer system that registers a physical product via a computer network and produces outputs indicative of a user character corresponding to the physical product, said user character being assigned to a user account that is stored on said user computer; said server computer system distributing virtual items including a plurality of different item templates and a plurality of different virtual materials into user storage associated with the user account on the server computer system, wherein the server computer system determines which of the plurality of different item templates and which of the plurality of different virtual materials to distribute to the user storage; and said server computer system creating a customized virtual item based on user input received on the server computer system via the computer network, wherein based on the user input, the server computer system creates the customized virtual item by applying at least one of the plurality of virtual materials that is stored in the user storage to one of the plurality of different item templates that is stored in the user storage.

Regarding another aspect, a computer system for crafting virtual items includes a server computer system that registers a physical product via a computer network and generates a user character corresponding to the physical product, said user character being assigned to a user account; said server computer system distributing virtual items into user storage associated with the user account; and said server computer system controlling creation of a customized virtual item based on user input received via the computer network, wherein based on the user input, the server computer system creates the customized virtual item by combining two or more of said virtual items that are stored in the user storage, and wherein in response to a finish request received by the server computer system via the computer network, the server computer system locks the customized virtual item so that no additional virtual items can be added.

According to still another aspect, a method for crafting virtual items is provided. The method includes registering a physical product on a server computer system via a computer network and generating a user character corresponding to the physical product, said user character being assigned to a user account; distributing virtual items including a plurality of different item templates and a plurality of different virtual materials into user storage associated with the user account, wherein the server computer system determines which of the plurality of different item templates and which the plurality of different virtual materials to distribute to the user storage according to calculated probabilities based on a characteristic of the user character assigned to the user account; and creating a customized virtual item based on user input received on the server computer system via the computer network, wherein based on the user input, the server computer system creates the customized virtual item by applying at least one of the plurality of virtual materials that is stored in the user storage to one of the plurality of different item templates that is stored in the user storage.

With respect to yet another aspect, a method for crafting virtual items includes registering a physical product on a server computer system via a computer network and generating a user character corresponding to the physical product, said user character being assigned to a user account; distributing virtual items into user storage associated with the user account; creating a customized virtual item based on user input received on the server computer system via the computer network, wherein based on the user input, the server computer system creates the customized virtual item by combining two or more virtual items that are stored in the user storage; and in response to a finish request received by the server computer system via the computer network, locking the customized virtual item so that no additional virtual materials can be added.

BRIEF DESCRIPTION OF THE DRAWINGS

FIG. 13 is a schematic illustration of an exemplary graphical user interface employed in connection with the system of FIG. 1 or FIG. 2.

DETAILED DESCRIPTION

Provided herein is a crafting system that allows users or players of a website to create their own "unique" virtual items for use on the site. With the crafting systems, players can collect materials from within a virtual social environment to customize items, which the player can use to express their individuality. Crafting can include materials such as, but not limited to, textiles and related finishes, edible materials, paint, as well as clay, stones and other earthen and organic materials to create pottery. Crafted items include but are not limited to clothing, shoes, accessories, jewelry, food, beverages, dishes, ceramics, paintings or other forms of artwork and designs and furniture. Note that all of these materials, in this paragraph, and as discussed throughout this specification, are virtual items for use on a website as described herein.

The crafting materials can be collected or obtained by the user and then used a limited number of times (e.g., one time) to make the desired item. Some materials are rarer than others and thus are more difficult to obtain. In particular, some materials or ingredients can be directly purchased during the game or on the website. Some can be revealed or uncovered during other game play or through the course of performing an activity in the game or website. Items can be altered or otherwise modified and need not be finished within a set time period. The user can begin to craft an item and then store it and return to it at a later time to perform more work on it. Items can be crafted in several stages or layers. For example, to achieve a particular look or pattern or color mix. The complexity of an item can depend on the user's materials and/or the template chosen. Some templates can offer either simpler or more complex design capabilities.

Users can also "sign" their items in a suitable manner in order to identify their items as their own creations. For instance, some users may become well known in the game or website environment for their crafted items and thus, their value or worth may increase. Security features may be employed in order to prevent or mitigate the potential for fraud such as modifying the item's signature or fraudulently copying a signature and adding to an unrelated item.

Crafted or finished items can be used by the user within the game or web environment as any other object or item is used throughout the game. They can also be gifted, bought and sold, or otherwise traded within the commerce of the game or website. A valuation system may be employed to assess a market value to the item based on the price of each material and the user's skill level—e.g., crafting skill level or demand for the user's crafted goods in the game or virtual environment.

Figure 1:
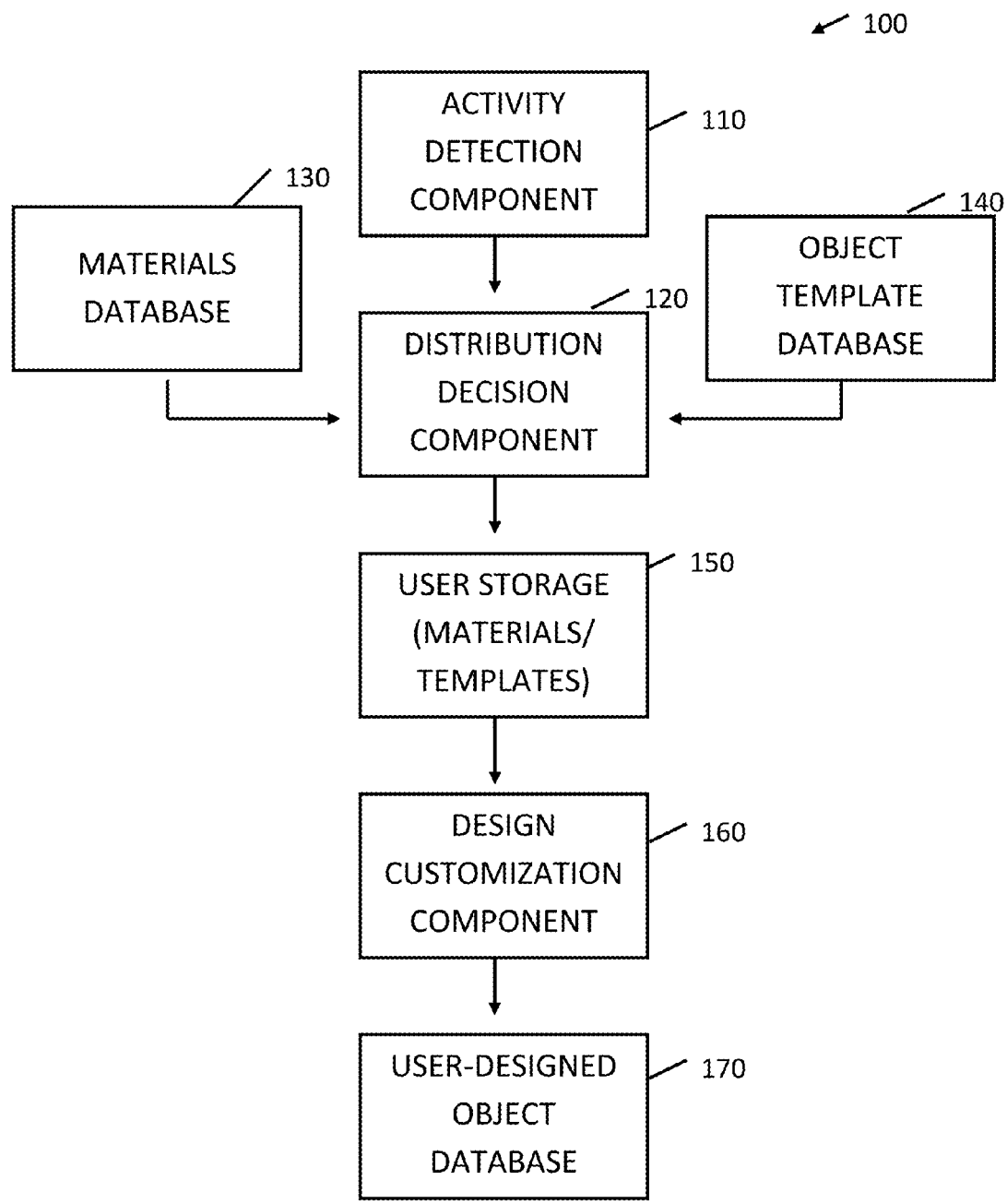
FIG. 1 is a block diagram of a crafting system that facilitates the creation of user-designed objects (e.g., clothing, accessories, furniture, art) using materials and templates that are made available through game-play or other detected and identified activity within a social or gaming environment.

FIGS. 1-13 depict various exemplary aspects of the subject crafting system and method. In FIG. 1, there is shown a block diagram of a crafting system 100 as it is executed on a computer, e.g., on a server computer system, providing information to one or many client computers, or on a computer which itself executes the operations. All of these components may be embodied by the actions of a single programmed computer.

The crafting system 100 includes an activity detection component 110 which identifies the type, frequency, and duration of each activity performed. It also identifies the participant who is performing the activity (e.g., village resident, visitor or tourist (e.g., resident to another village or not a resident of any village)) such as by name and status. The status of a user indicates whether the user has registered at least one physical product with the system and if so, the village name in which the user's virtual product resides. Each user has a user account assigned.

The kinds of activities which are detectable include any activity or game that a user can do or play in the environment. By way of example, this includes but is not limited to actions associated with buying a homestead lot, selecting a home structure, furnishing the home, planting flowers and trees around the home, building up the village with community structures and outdoor areas, shopping for items, playing games to earn currency, performing a job, cleaning the village and maintaining its appearance, meeting a virtual friend (another user), registering additional physical products to a user's account, etc.

As the user's activities are detected, the corresponding data regarding the type of activity and/or frequency and characteristics or other information about the user's characters (e.g., type of character, status or skill level of the character) is communicated to a distribution decision component 120. The distribution decision component 120 analyzes the data and determines whether to give or offer a bonus item (e.g., a drop) to the user. For example, a character having a higher level of skill will an increased probability of being offered higher quality or rarer item drops. The bonus item is selected from at least one of a materials database 130 and an object template database 140.

The materials database 130 contains various types of materials that are useful in creating an object such as a piece of clothing or artwork or a piece of furniture. This includes fabric textures, fabric patterns (e.g., stripes, polka-dots, paisley, solid, faded, tie-dye, etc.), paint, stain or dye colors, brushes, buttons, zippers, snaps, sequins, rhinestones, glitter, threading detail, grommets, cut-out patterns, pockets, pouches, ruffles, large gems or oversized rhinestones, bows and other materials that alter an object's geometry, wood textures and types, etc. The object template database 140 contains templates of items or objects that can be designed and crafted by the user. This includes but is not limited to all types of clothing, accessories, shoes, home furnishings, textiles, and art canvases.

The distribution decision component 120 determines which database to select from as well as which bonus to gift or make available for the user's (free) taking. The bonus or free item selected for a particular user depends one or more of the following: the user's registered character that has performed the activity (e.g., teacher, athlete, chef, student, baker, doctor, etc.), the skill set or expertise of the character, and the level of skill the character has or has achieved. Historical data can also be referenced such as the items previously gifted to this particular character (avatar). Users can increase the skill level of their characters by using their characters to participate in skill-building activities, such as virtual jobs, games or other virtual activities, which also trigger item drops.

Some items are deemed to be special or rare and thus, those items are more difficult to obtain. The gifted item is stored in the user's material-template storage 150 that is associated with the user's account until the user decides to use it.

When the user is ready to create an item, their available materials and templates are communicated to a design customization component 160 and presented on a user interface from which the user can readily view and select. Each gifted item has a limited number of uses associated with it. For example, once a shirt template and red dye are used, they are no longer available to create another item. The user will have to perform additional activities in the virtual environment in order to earn those items again.

The design customization component 160 offers different features which facilitate creating unique items that may be difficult if not impossible to recreate by another user who sees the item. The difficulty of recreating a unique item which has been designed by another depends on the rarity of the materials used in the design and how many materials are included in the design, including those that are rare. The features include techniques such as layering, blending, cut-outs and sew-on, and the like. When multiple materials are used, it is difficult to identify the exact materials used or to recognize the order and placement of them to achieve the final look of the item. Thus, the user has the opportunity and resources to create items which are unique to their design skills and in the virtual environment, such items can be sold or otherwise traded for virtual or real currency. The design customization component 160 also affords the user the ability to include her signature on the item and to "fix" or lock the designed item in time to prevent others (e.g., a buyer or subsequent owner) from modifying it. Such user-designed objects are stored in a database 170 until the user decides to sell or trade it to another user. Once fixed, each user-designed object has a unique identification in the database 170, so only one copy of a particular user-designed object may exist in the system.

Figure 2:
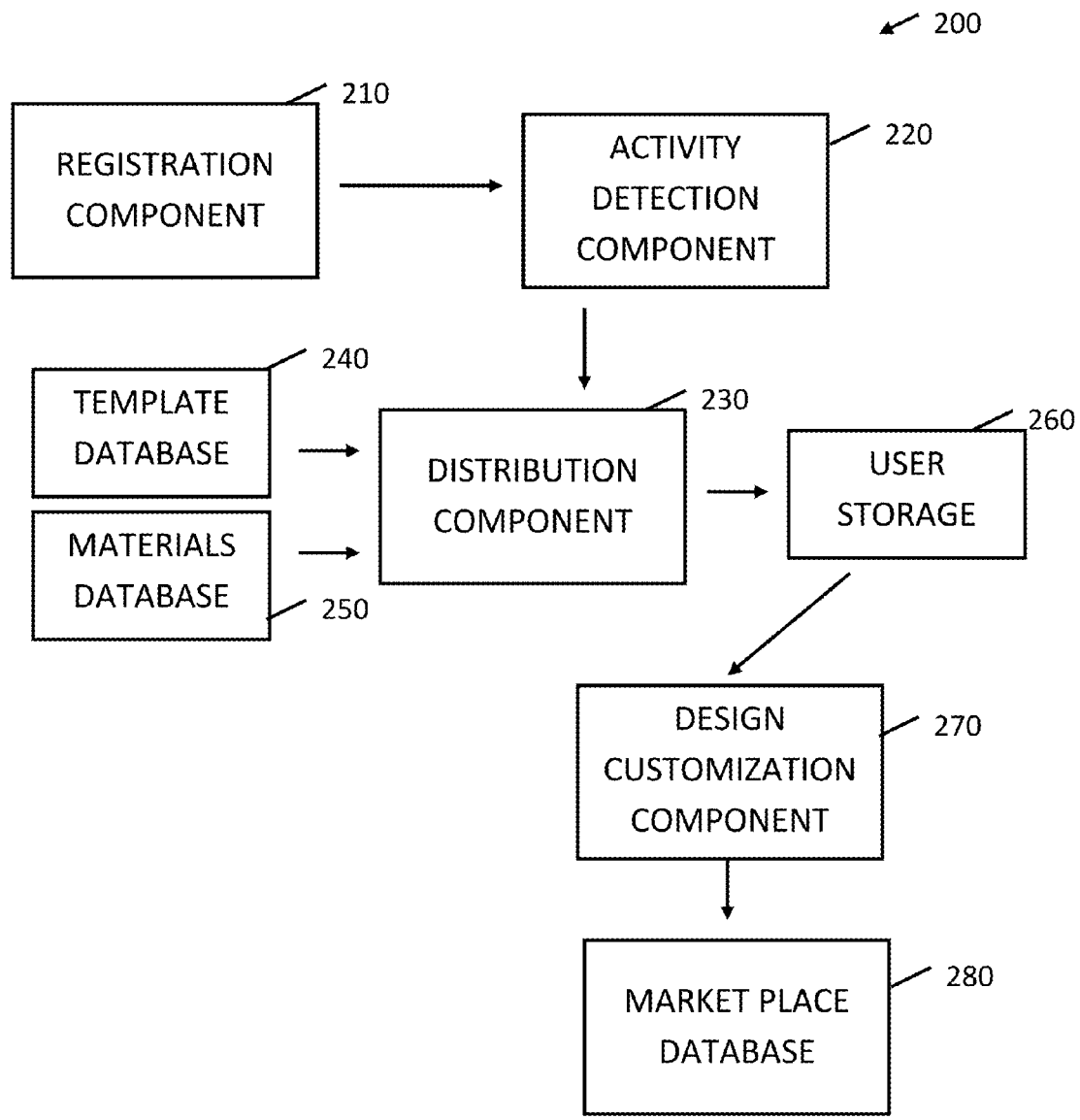
FIG. 2 is a block diagram of a crafting system that facilitates the creation of user-designed objects (e.g., clothing, accessories, furniture, and art) for registered virtual representations of real/physical products using materials and templates that are made available through game-play or other detected and identified activity within a social or gaming environment.

FIG. 2 also shows a crafting system 200 which is similar to the system 100 of FIG. 1. In the system 200 of FIG. 2, a registration component 210 is included which receives registration information for physical products. More specifically, the registration component 210 processes a unique code which it receives in order to connect the product to the user's account on an internet website. The unique code corresponds to a specific physical product, for example, a figurine or plush character. Once it is entered and processed, a virtual representation of the physical product appears in the virtual environment for the user's control. The virtual representation of the user's physical product becomes the user's character (also referred to as a villager) in the virtual environment and her interactions in the virtual environment are made via the virtual representation of the physical product. The user can register more than one physical product and hence control more than one character in the virtual environment.

As the user's character participates in the virtual environment, the activity is detected as stated above via an activity detection component 220 and communicated to a distribution component 230. As warranted according to the user and the activity, the distribution component 230 selects an item drop (bonus or free item) from either a template database 240 or a materials database 250. As described above with regard to FIG. 1, the drop item selected depends on, among other things, which specific character(s) the user has registered (e.g., teacher, athlete, chef, student, baker, doctor, etc.). Thus, the probability of the user receiving a particular material or template in an item drop will depend at least partially on which physical product(s) the user has registered using the registration component 210. Thus, the particular materials and templates that a user has available for use in the crafting activity are significantly dependent on the particular combination of characters the user has registered.

Assuming the user takes or accepts the item drop, it is stored in storage 260 associated with the user's account. In some cases, the user is not given a choice and the item drop is automatically deposited in storage 260. User storage 260 also holds the raw materials used for crafting such as the templates and the crafting materials (e.g., fabrics, dye color, accoutrements, etc.).

Any crafted items which were previously created by the user are also stored in the storage 260. This includes crafted items which are in the process of being created but are not yet finished. Blank template items and in-process crafted items stored in the user's storage can be customized using the design customization component 270 as described in more detail in the figures below. Those items which are finished and desired to be sold are placed on the market (via marketplace user interface) and optionally moved to marketplace storage database 280, where other items offered for sale by other users are stored.

Figure 3:
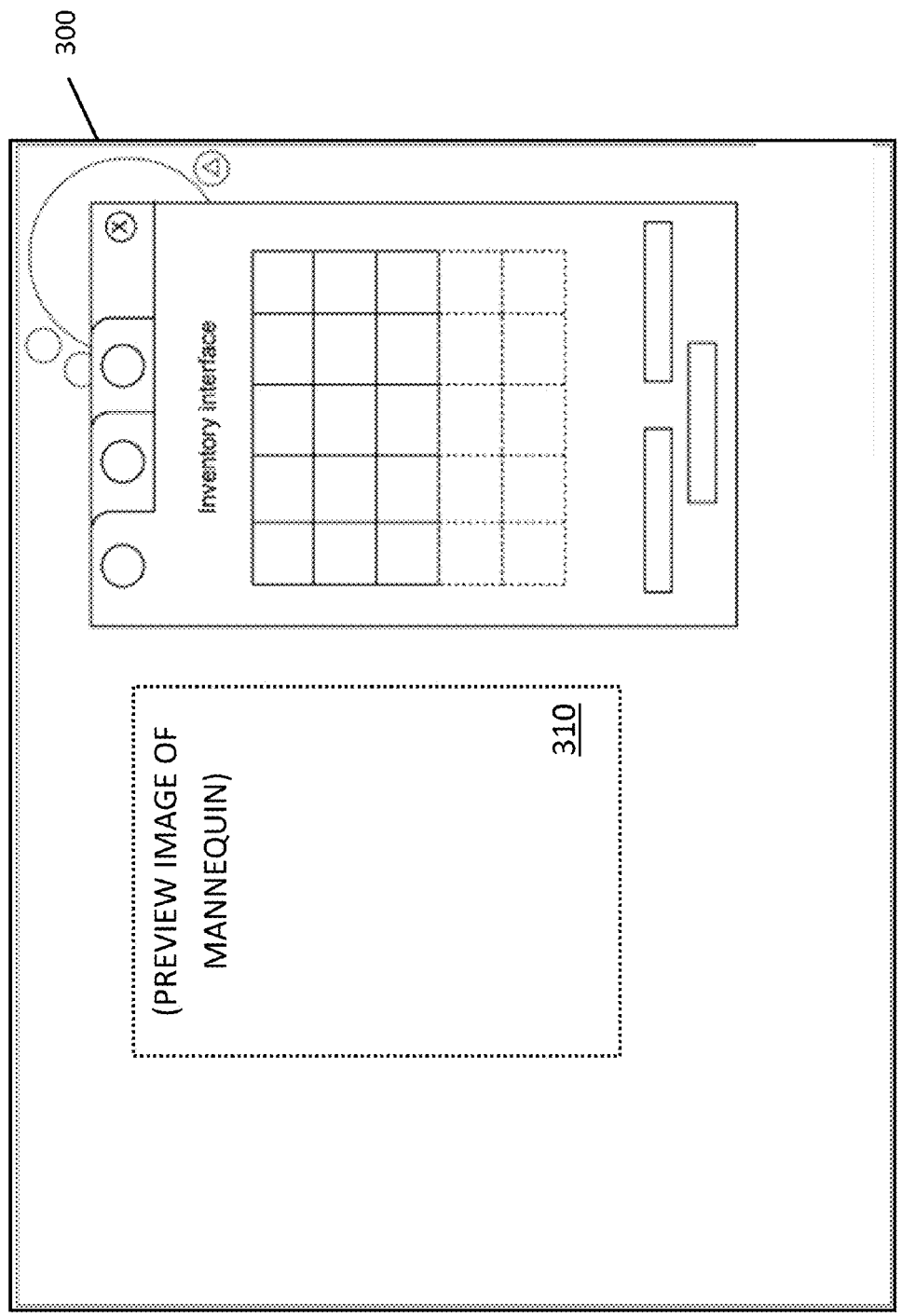
FIG. 3 is a schematic illustration of an exemplary graphical user interface employed in connection with the system of FIG. 1 or FIG. 2.

Turning now to FIGS. 3-13, the mechanics of crafting an item through the use of the systems 100 and 200 described above are demonstrated from the perspective of exemplary user interfaces. FIG. 3 represents an inventory user interface 300 which is employed to show the user their inventory of materials and templates. A preview mannequin 310 can also be viewed which will assist the user during the design portion (e.g., previews image of the item being crafted).

To craft an item, a template item is needed, which is a basic item that can be customized. Examples of template items would be a "plain white T-shirt", a "plain and simple rectangular wooden table", etc. The template item also has a certain number of slots (permitted modifications) in which materials can be applied to customize the item.

Materials are applied to a template item by using a drag-and-drop interface. Materials are single-use, though some may be designated to have additional uses as part of the "bonus" or gift. After the materials are applied as desired, the user selects a "CRAFT THIS!" button to confirm the design. Once "crafted" onto the template item, the materials cannot be removed. In an alternative embodiment, a user may be permitted to remove a material from an in-process (unfinished) template and return it to her inventory. The specific order and combinations of materials the user employs to the chosen template define the final crafted item. As described above, because different users will have different materials and templates available to them depending upon factors such as which character(s) they have registered, the skills they have acquired and which drops they have obtained, the final crafted item will be somewhat unique and difficult for another user to reproduce.

Figure 4:
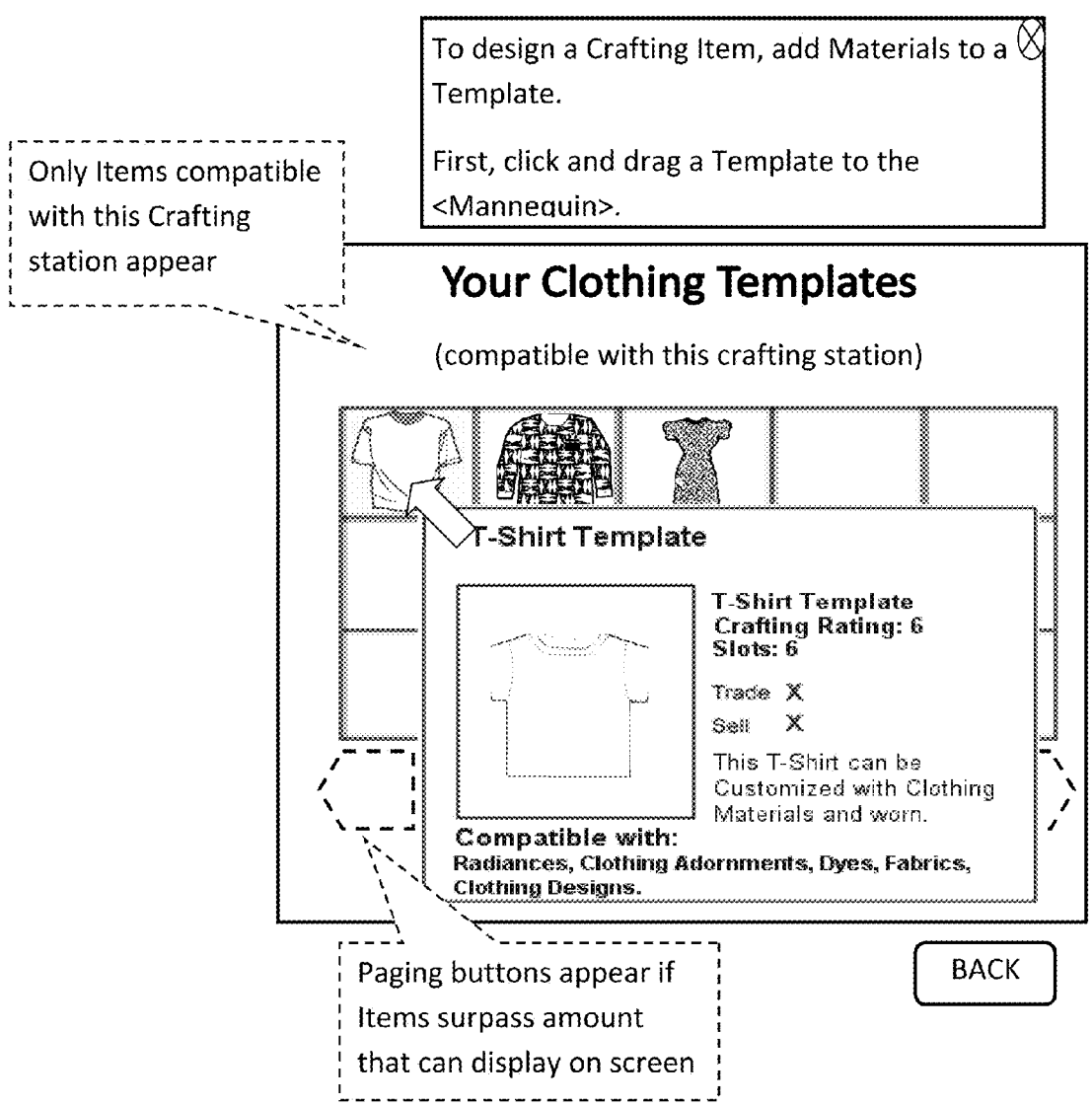
FIG. 4 is a schematic illustration of an exemplary graphical user interface employed in connection with the system of FIG. 1 or FIG. 2.

FIG. 4 illustrates the user's template inventory. A brief description of the template is viewable when the cursor is rolled over the template. Instructions also can appear in this interface to guide the user through the design process. For example, to begin crafting an item, a template needs to be dragged to the mannequin.

Only templates which are suitable for this type of crafting are viewable in this interface. The template item is the basic building block of all crafted items. So for example, a red, striped, diamond-button dress T-shirt and a purple T-shirt with a front pocket both start out from a T-Shirt template item while the black evening dress and the purple sequin lace evening dress were created from the Evening Dress template item.

In general, there are several different ways for a user to get template items. For example, they can be purchased from real or virtual stores in the virtual environment or they can be gifted as an item drop. Some templates are more readily available or attainable while others are less common. For example, templates with fewer slots are more common and available than templates with many slots. This is because as the number of slots increases, the user's design can become more complex and unique. This may translate to a higher market demand or value for that design.

There can be restrictions placed on the trading of templates between users. For example, an empty template item, or a template item with one or more materials on it, cannot be bought/traded/sold/vended to other players. However, a template can be sold to a NPC (non-player character) Cashier (e.g., sold back to the system) at a fraction of the template's worth or original cost. Templates can also be discarded by the user through the Inventory interface, though no currency is received for this.

Crafted or designer items can be sold/traded/vended to other players within the virtual environment, or listed on an e-commerce marketplace. If the designer item is sold in the marketplace, it is no longer tradable/sellable/transferable in-game, and cannot be resold in the marketplace. At any point, a designer item can be sold to a NPC Cashier at a fraction of the item's worth or original cost.

According to one embodiment, each template item has a minimum and a maximum number of (initially) empty slots. The actual number of slots varies depending on the specific instance of the template item, and may be randomly set by the system, for example. Each slot can hold one material. To make the crafting experience more interesting, template item instances with fewer slots are more common, and those with more slots are rarer and more difficult to obtain.

As indicated in FIG. 4 in the "Your Clothing Templates" screen, not all materials in the user's storage are displayed here. Only those materials that are suitable for the type of crafting are displayed. Types of crafting include but are not limited to designing clothing and designing furniture. There are also limitations as to a quantity of certain materials that can be applied to a template. For example, texture is one material type and the design customization component (160, 270) can limit the number of textures applied to a hat template to be one (e.g., one texture per hat template). On the contrary, some material types can be applied to a template without limitation. Some templates may also have assigned mount points for at least some of the material types. For example, the mount point or placement on a shirt or jacket template of a "hood add-on" item to make a hooded shirt or jacket may be restricted to the backside collar portion of the shirt or jacket. Dropping or placing the "hood" on a sleeve or front part of the shirt or jacket would not be allowed. Material types and classes are discussed in further detail below.

In general, the default color of the template item is white. Each template item can support a maximum number of a 'color' material type. Some templates may support only one color while other templates which support more complex designs may support more than one color. If more than one color is supported, then the template may allow discreet areas of the template to be different colors or the template may allow color mixing and blending. Dropping a color onto a template item will color the majority of the object this color (e.g., see FIG. 7 below). With regard to clothing templates, each has zero or more alteration points, which are sections that can be subjected to minor lengthen/shorten adjustments.

By way of example, an evening dress template item may have the following characteristics:

Minimum number of slots per instance: 3.
Maximum number of slots per instance: 9.
Compatible material types: fabrics, fabric dyes, fabric adornments (zippers, buttons, snaps, sequins, rhinestones, thread detail, etc).
Alteration points: 2—collar length and dress length.

In view of the above characteristics, every evening dress created would have the above properties, but the number of slots on any dress is between 3 and 9. With reference to FIG. 4, the T-shirt template depicted has 6 slots and can be customized or designed with "clothing materials" and is compatible with materials such as radiances, clothing adornments, dyes, fabric textures and patterns, and other clothing designs. It is also noted that this template can be traded or offered for sale to others.

Aside from just the appearance of a blank template or the finished designed item, templates, in-design (in-process) items and finished items are given a quality rating. The quality rating value for a template is slightly different than quality rating values for other materials that are applied to the templates in terms of the actual value assigned. For in-process and finished items, the quality rating is the sum of the quality ratings of the different materials used in the item plus the quality rating of the original template item. The quality rating of in-process and finished items can help prospective buyers of the items and can also make items more marketable than others. Examples of the quality rating are as follows:

A Template T-Shirt with a quality rating of 5 (and no materials) has a total quality rating of 5.
A Template T-Shirt with a quality rating of 5, a color material of quality 8 and a texture material of quality 1 has a total quality rating of 14.

Figure 14:
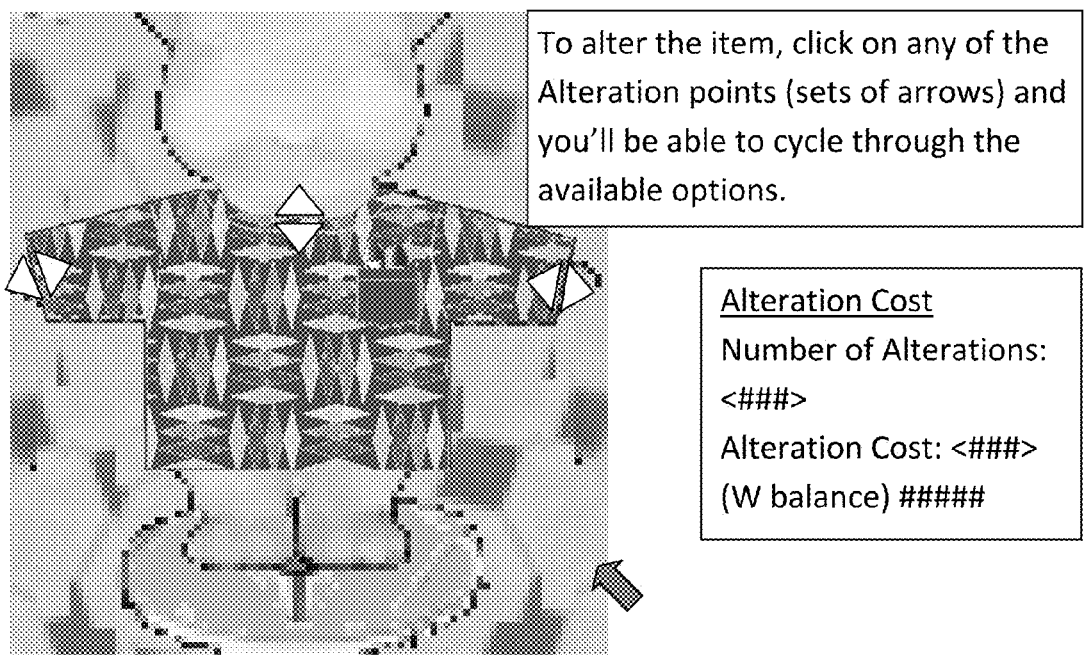
FIG. 14 is a schematic illustration of an exemplary graphical user interface employed in connection with an alteration feature of the system of FIG. 1 or FIG. 2.
Figure 15:
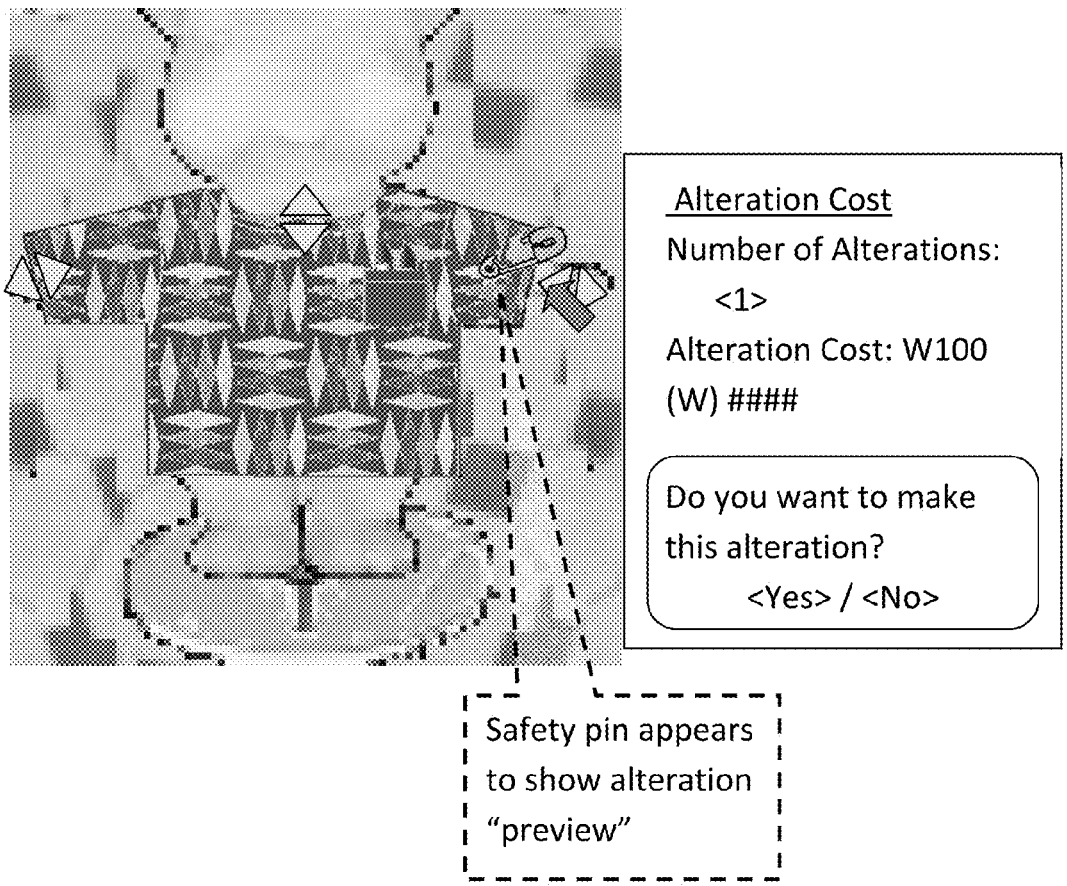
FIG. 15 is a schematic illustration of an exemplary graphical user interface employed in connection with an alteration preview feature of the system of FIG. 1 or FIG. 2.

Some crafting items may have sections that are alterable. These sections will be visible by two clickable points or arrows as shown in FIG. 14. To "alter" a section, one of the alterable points or arrows can be clicked on and moved. FIG. 15 illustrates that once an arrow has been moved to a new position (e.g., on a sleeve), a safety pin graphic appears to indicate that the item has been altered at that location. In addition, the user views a preview of the new length, for example—as shown in FIG. 15.

The term "alteration" generally applies to clothing or cloth materials, so only certain Crafting Stations have the "Alter" radial menu option. Alterations can be made to compatible Finished (Designer) and In-Design Items. Players can alter a Crafting Item as often as desired; however, there is a cost associated with each alteration made. The alterable section can extend/retract OR widen/shrink in the direction of the arrows; but an action to extend AND widen is not permitted, for example. For each alteration point, a minimum and maximum length that each section can be stretched is set by the system. It may also be possible to alter the geometry of an item. Otherwise, each alteration point will have pre-built increments that appear/disappear as the point is clicked. Some alteration is automatically asymmetrical. For example, if one shirt sleeve is lengthened, the other sleeve will need to be lengthened as well by the user. However, in the case of crafting pottery, for example, alterations are symmetrical. In practice, the term "alteration" is normally used for clothing and "reshaping" is used for pottery items.

The template items as described above can correspond to specific items such as a clothing item or a furniture item; however, a template item can also correspond or indicate a free-form item to be created and customized. The free-form item does not include predetermined limitations such as the number of slots, alteration points, mount points or other restrictions that somehow dictate the type or number of materials to be combined or arranged. Because the item can take on any form as desired by the user, there are no predefined portion shapes or sizes within an item—compared to a shirt template which requires the sleeves to be of equal length. By way of further example, a free-form chair may not have 4 legs if the user would rather design one that has 3 legs.

In addition, a free-form item can also be programmed to perform an action or function. For example, a free-form chair can be programmed to rock or swivel or another free-form object can be programmed to open and close. Music or other media can also be attached to a free-form object such as by way of an actionable button placed on or near the free-form object. For instance, a free-form object may be programmed to display one or more (real) photographs. Likewise, a different free-form object can play a favorite song when an "actionable" button is pushed on the object.

Materials are applied to template items to create unique items by way of slots on the template. To apply a material to a slot, the slot needs to be empty, the template item needs to support the material type (the UI box automatically filters out unsupported materials), and the material cannot be a duplicate of a material already applied to the template. It should be noted that, in the disclosed embodiment, materials cannot be removed once crafted onto a template item and materials crafted onto a template item are considered used and disappear from user's material inventory. A player can add one or more materials to a template item in a single session or can save design work that has been done and continue it later. Additional materials can be added to the template assuming there is room and at any time, so long as the template item isn't "finished." Note that materials added in later sessions are added on as layers that are above materials that were crafted onto the template in previous sessions.

As previously mentioned, each material belongs to one material type. For example, the materials "Blue Diamond Brooch" and "Red Emerald Brooch" belong to the "Brooch" material type. Each material type belongs to a material class. A material class is a governing rule set on how those materials are used on the template. Exemplary material classes can have the following rules:

Color: Dropping a color onto a template item will color the majority of the object that color. At least some of the templates are limited to just one color.

Texture Type 1: These are patterns that are applied on layer(s) above the primary color. Textures have color. So if a Red Stripe pattern is applied to a Yellow T-Shirt, then the result is a Yellow T-Shirt with Red Stripes.

Position and size of the Texture depends on its Subclass.
For Clothing Design, depending on its Subclass affects the size of the Design and where it is located on the Template. For example, a Design may be a repeating texture or an image. If it is an image it is available as a single or a double (front and back). The Emblem Subclass is smaller (and has a different position) than the normal Clothing Image subclass.

A user can place as many material type textures onto a Template as the maximum slots allow.

The layering of these textures is determined by the user through an interface.

The layer of a texture determines what color/other texture that texture inherits.

Decals are also considered Textures. The difference is that when it's applied to the object, it is not repeated across the entire object. Examples of decals would be: a stripe on a vase, an emblem on a Shirt, Cuffs on a Shirt, Belts on Pants, putting a Front Pocket on a Shirt, etc.

Texture Type 2: Similar to Texture Type 1 except for the following:
Only one material type of Texture Type 2 can be applied onto a Template.
An example of a Type 2 Texture is Fabric. A player is not permitted to put a Cotton Fabric and a Denim Fabric onto the same piece of clothing.
Another example of a Texture Type 2 would be a "sequins" material type for dresses.
The layering is determined by the user through an interface.
The layer position of a texture determines what color/other texture that texture inherits.

Geometry Accessories have a specific geometry when attached to the template item. For example, a Bow on a Dress, Belt Buckles on Pants, etc.
Position is predetermined.
For material Types that are Geometry, a user may only apply one to a Template.

Effects: An accessory/effect that is not directly attached to the object. Examples of effects are Sparkles, Rays of Light, Glow. Effects can generally be applied to all template items.
For at least some templates, only one type of effect is allowed.

In practice, for example, some possible material combinations for a 3 SLOT SHIRT are:
Sparkle Trail, Metal Cameo, Rose
Red, Denim, Fish (single clothing image)
Fish (single clothing image), Floral (clothing pattern), Eagle (clothing emblem)
Eagle (clothing emblem), Fish (single clothing image), Floral (clothing pattern)
Fish (single clothing image), Fish (double clothing image), Fish (clothing emblem)
Floral (clothing pattern), Toile (clothing pattern), Corn Cobs (clothing pattern)
Corn Cobs (clothing pattern), Floral (clothing pattern), Toile (clothing pattern)

Some NON-compatible material combinations for the 3 SLOT SHIRT are:
Side Bow (Dress Belt), [anything], [anything] (incompatible because a shirt cannot contain a dress belt material)

Floral (clothing pattern), Floral (clothing pattern), [anything] (incompatible because the same material cannot be applied twice on the same template)

Denim, Tweed, [anything] (incompatible because two Type 2 Texture materials cannot be applied to the same template)

Materials in a user's inventory are represented by icons. A single material may (or may not) be applicable to several different template items. For example the color Blue can be applied to any Shirt, Dress or Skirt template item.

Materials can be obtained in a variety of ways such as the following:

As an item drop reward from play activities, quests, daily activities, events, etc. (the materials are integrated into drop lists).

Purchased on an e-commerce platform using real currency.

Purchased in virtual store inventories (there are infinite amounts of these materials) for real or virtual currency.

If a user has materials that are unwanted, the following can be done to unload them from the user's inventory:

Can be sold to a NPC Cashier, which will give the user virtual currency in exchange for the material equal to a percentage of the material's worth. Note the material is now considered used (destroyed); it does not show up in any store inventory and cannot be purchased by anyone else.

Can also be discarded as "Trash" from the UI inventory screen (but no money is received for this).

In an alternative embodiment, users may be permitted to gift, sell or trade materials and templates directly with other users.

In the virtual environment, crafting can be done at designated crafting stations located throughout the virtual environment. For example, in one part of the virtual environment such as a central town or village, there is a building that has an NPC that will craft (affix materials to template items) materials for the user. This NPC's crafting ability is limited (not skilled to craft highly-rare materials). Scattered throughout other parts of the virtual environment are other Crafting Stations that have full ability to Craft items that are compatible with the station. All levels of Crafting can be done in a village, such as in an Activity/Skill building that is owned by the user. When a user purchases an Activity building, she has an option of purchasing the Crafting upgrade for that building (represented by an object (station) in that building). Clicking on the object will allow the user to craft the related template item. For example, clothing template items must be crafted in Design buildings on the Clothing Crafting Station. Pottery template items must be crafted in the Design buildings on the Pottery Crafting Station.

Some conditions need to be satisfied and some guidelines should be followed in order to successfully craft:

First, a player should have template items in their inventory that are compatible with the Crafting station (and non-Finished).

The player should also have materials that are compatible with the template item she wishes to use.

To craft, a player needs to enter a Building to access the Crafting station. This is a Skill Building in a village or central town.

The Crafting Building in Starting Town can only craft up to a certain Quality level.

Crafting begins when the player selects the "Craft" option on the Crafting station.

When the player clicks on the "Craft" button, the following may occur:

The villager automatically positions itself to the front of the object.

The camera zooms in to a fixed location behind the villager. And the Crafting Interface loads.

The user can still see her (avatar) villager, but she is no longer controlling it.

When crafting, there are some common screen elements to facilitate the process. These include: a preview mannequin which can be a 3-D object or figure to which a template and the selected materials are dragged for a preview of crafting them together; a message window, which is a non-interactive window that displays instructions to the player; and an interaction box which displays options and buttons for user selection. A back button is also present which allows the user to skip back a step. A chat window allows the user to chat with others while crafting.

Figure 5:
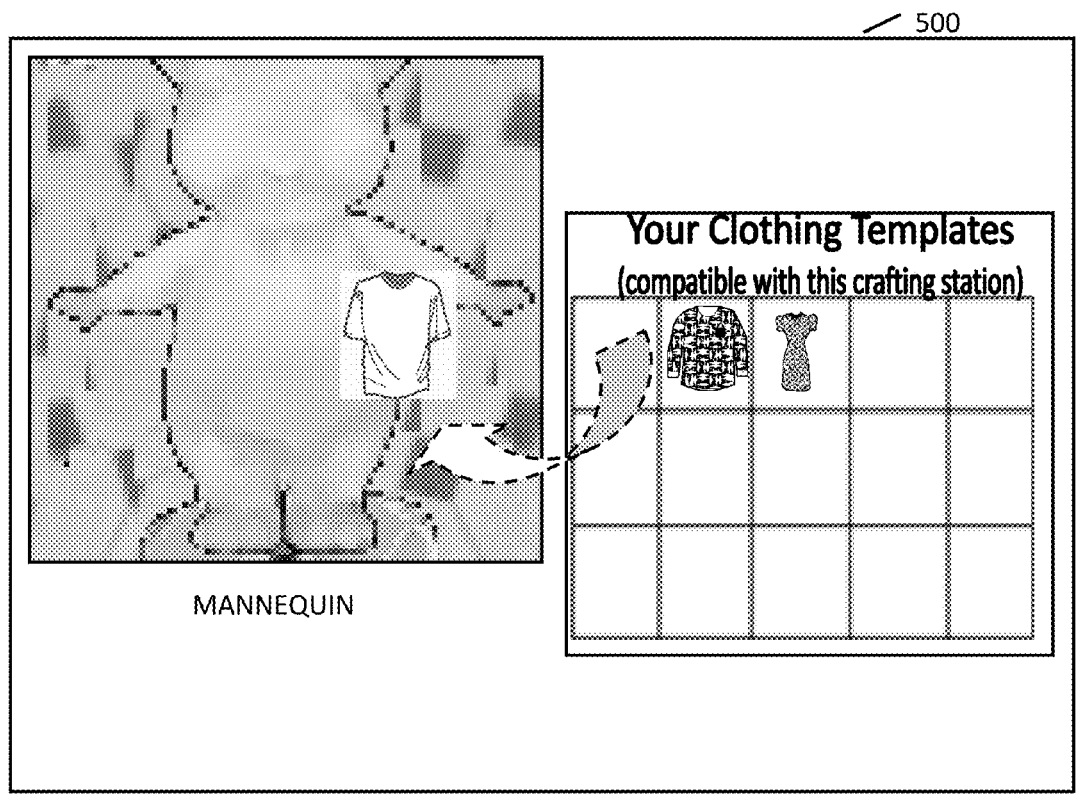
FIG. 5 is a schematic illustration of an exemplary graphical user interface employed in connection with the system of FIG. 1 or FIG. 2.

Referring now to FIG. 5, there is a schematic screen view of a crafting interface. Here, a player selects a template item (that she wishes to add a material to) by clicking, dragging and dropping a template item from the Interaction Box to the preview mannequin, as illustrated by the arrow. Only the template items which are compatible with the crafting station are shown to the user for potential selection. Cursor-over of a template item brings up the Item Card for that Item.

After the player drags a template item to the preview mannequin, the player now needs to click, drag and drop ONE or MORE materials (that they wish to preview/craft) to the preview mannequin.

Figure 6:
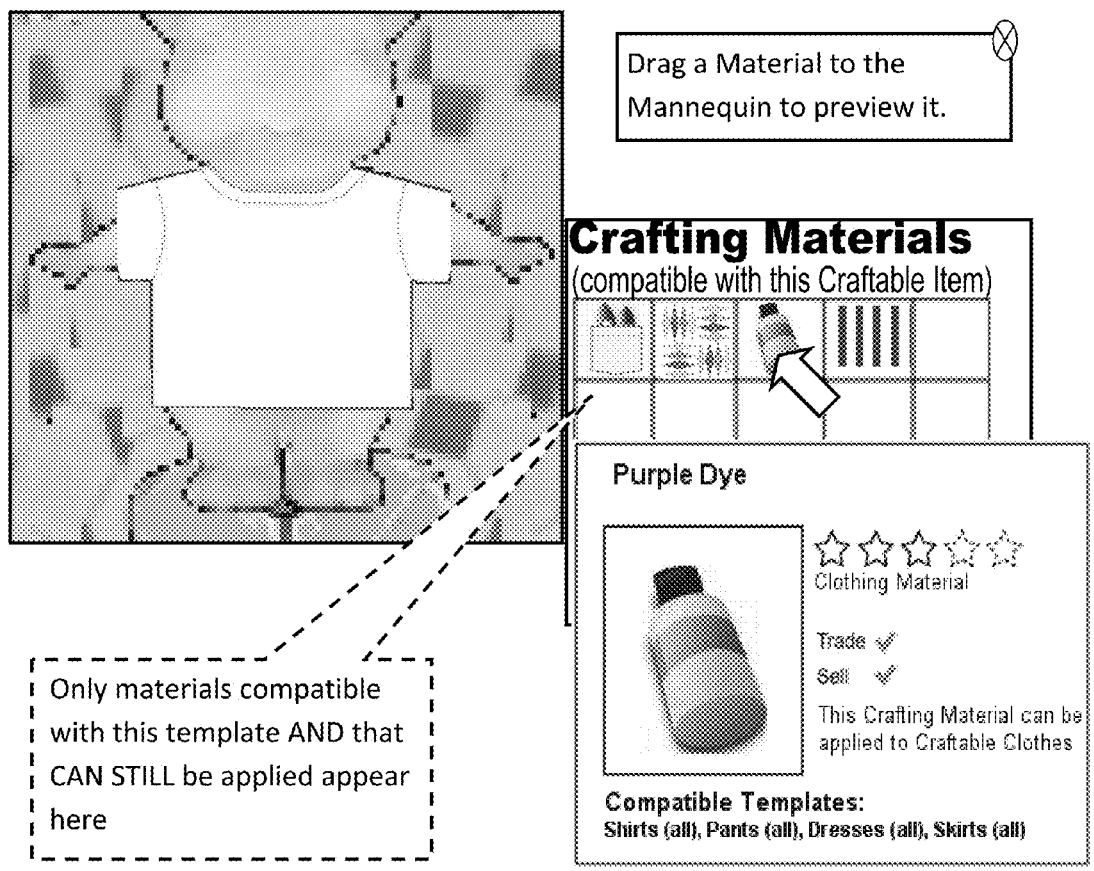
FIG. 6 is a schematic illustration of an exemplary graphical user interface employed in connection with the system of FIG. 1 or FIG. 2.
Figure 7:
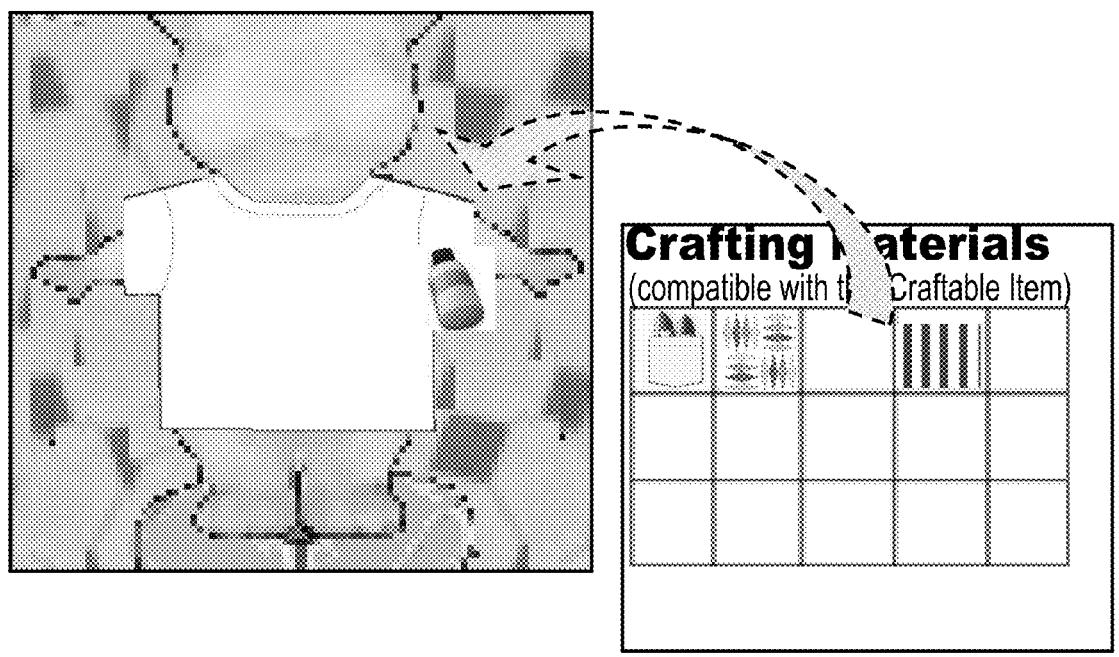
FIG. 7 is a schematic illustration of an exemplary graphical user interface employed in connection with the system of FIG. 1 or FIG. 2.
Figure 8:
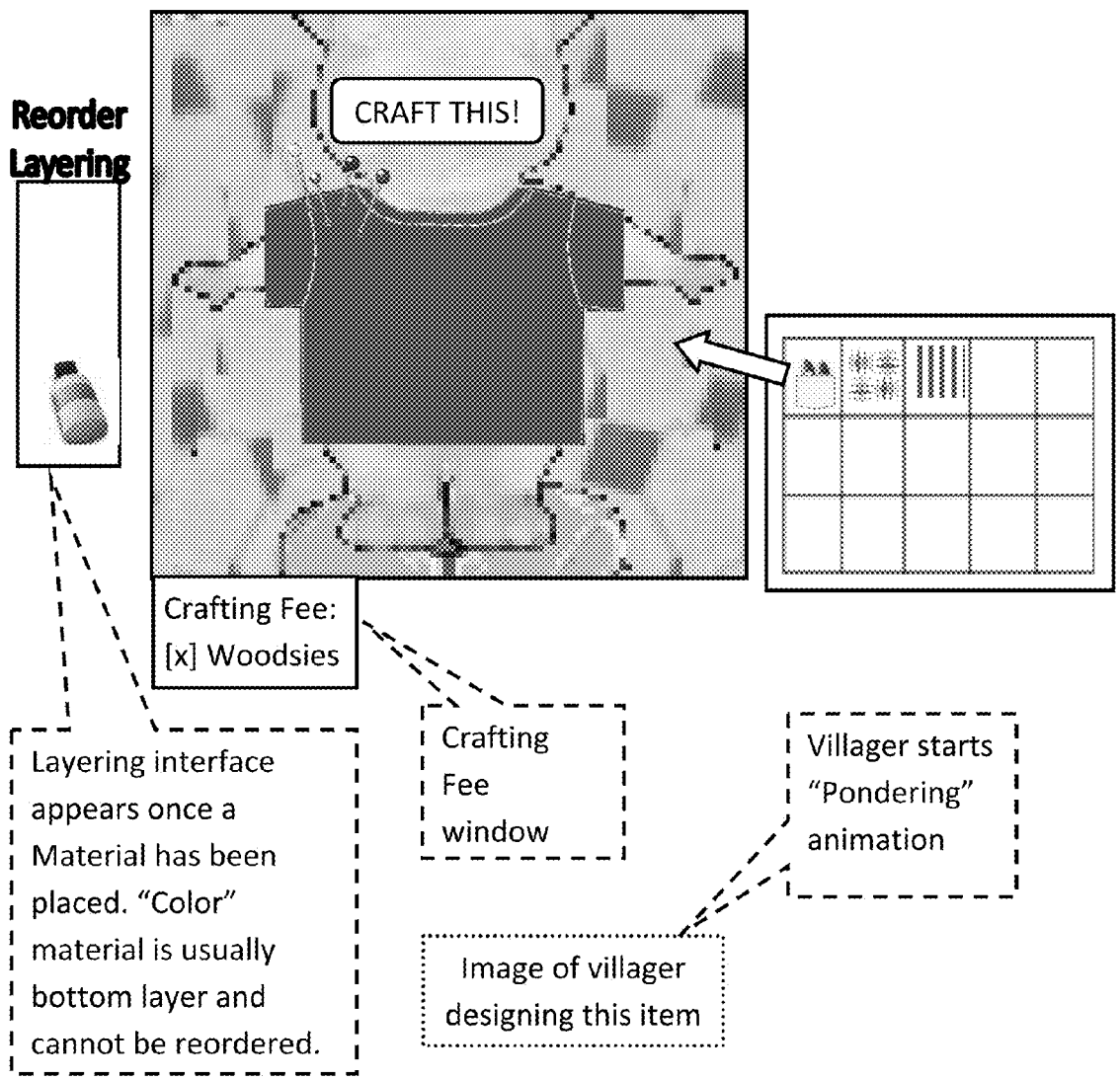
FIG. 8 is a schematic illustration of an exemplary graphical user interface employed in connection with the system of FIG. 1 or FIG. 2.

An exemplary screen view showing the Crafting Materials UI is shown in FIG. 6. Cursor-over of each crafting material reveals information about each crafting material. FIG. 7 illustrates the drag and drop of an available crafting material onto the t-shirt template that the preview mannequin is wearing.

The preview mannequin displays a larger version of the selected template. Any materials dragged to the template item will be previewed on the Mannequin, but the attached material is held in-place by a "holding item" such as straight pins for clothing or nails for furniture to show it is a preview.

Figure 9:
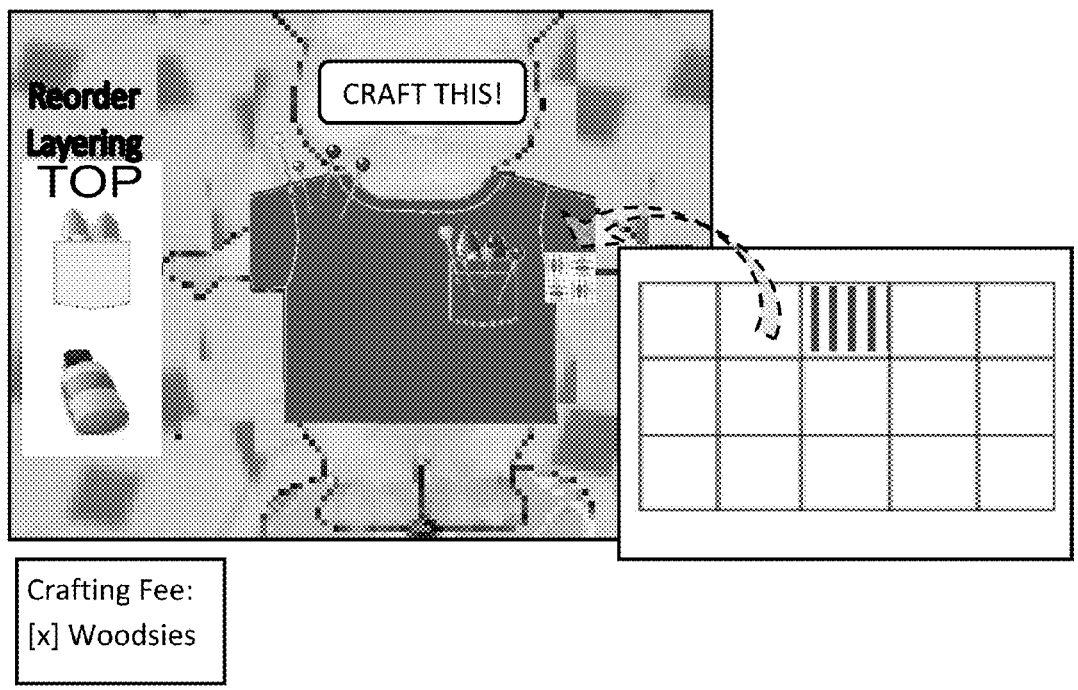
FIG. 9 is a schematic illustration of an exemplary graphical user interface employed in connection with the system of FIG. 1 or FIG. 2.
Figure 10:
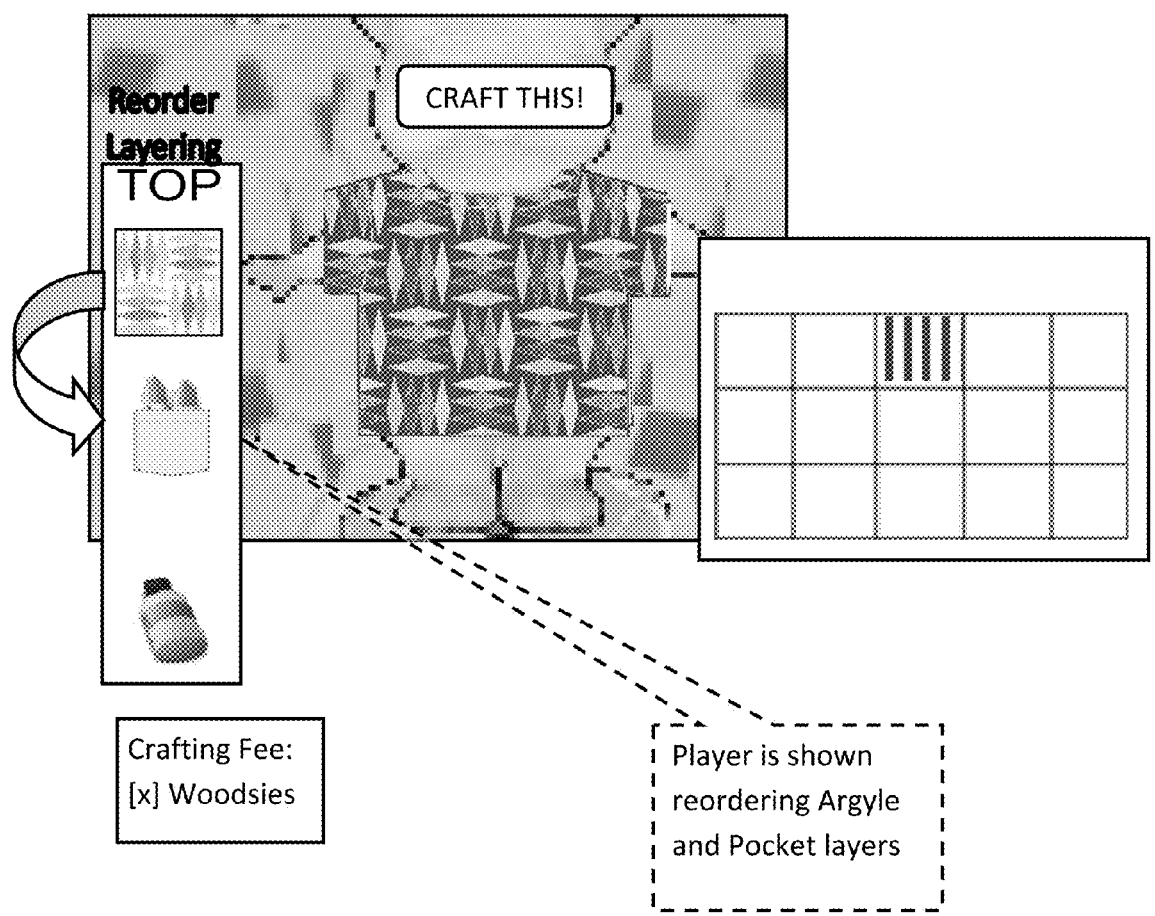
FIG. 10 is a schematic illustration of an exemplary graphical user interface employed in connection with the system of FIG. 1 or FIG. 2.
Figure 11:
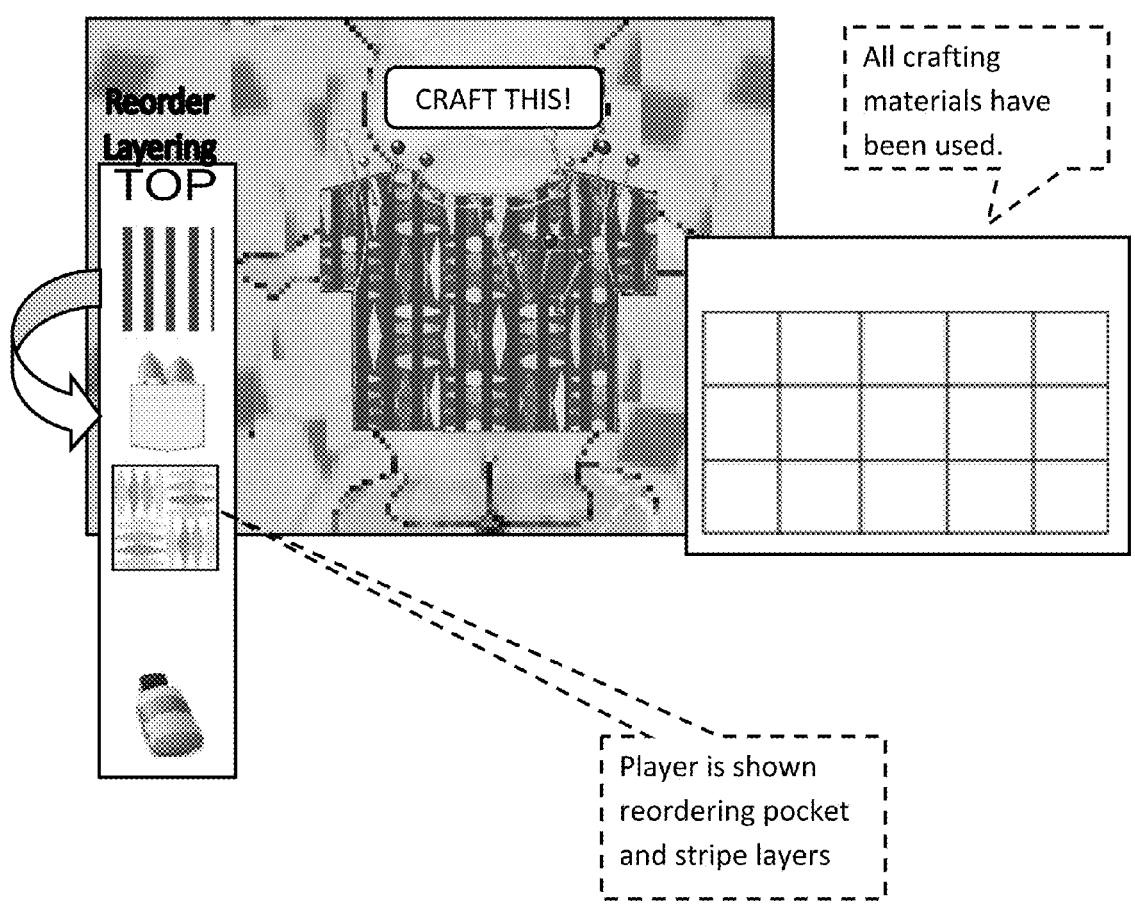
FIG. 11 is a schematic illustration of an exemplary graphical user interface employed in connection with the system of FIG. 1 or FIG. 2.

Once a user places a material onto the template, a "reorder layering" interface appears as shown in FIGS. 8-11. In FIG. 9, a pattern texture is being applied to the template. The layering UI allows players to reorder their materials (e.g., textures) by clicking on a material and sliding the material up or down to its desired layer slot or location. See FIGS. 10 and 11. To indicate which materials can be reordered to a different layer position, those materials which can be reordered appear with a specific colored background. By contrast, non-orderable materials are grayed out and cannot be selected. For example, colors are non-orderable and are placed as the bottom layer by default in the reorder layering UI. For example, in FIG. 10 the argyle layer is obscuring the pocket layer, so the player must move the argyle layer down so the pocket layer becomes visible. Again, in FIG. 11, the player moves the stripes layer down so that the pocket layer is visible. Also shown is a "Craft This!" button which appears once a material has been dragged onto the mannequin. Pressing this button will open a Confirmation Screen as shown in FIG. 11 (or the player can continue to drag and drop materials).

As illustrated in FIGS. 8-12, there is a crafting fee associated with designing an item. The crafting fee box keeps a running total of the crafting session, and changes as the user adds/removes materials.

After pressing the "Craft This!" button, a message window appears asking the player to confirm the action (assuming the player has enough money). If the user does not have enough currency to pay for the crafting session, then a message to that effect will pop up and the user can save the project and continue it later.

The cost of the crafting fee depends on at least 2 factors: the rarity of the materials being applied and the slot number to which it is applied. For example, below is a Crafting Fee Table that indicates the crafting fee based on rarity a material and slot number to which the material is applied:

|  | Rarity | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Crafting Cost | 5 | 10 | 20 | 35 | 55 | 80 | 110 | 145 | 185 | 230 |
|  | Slot | | | | | | | | | |
|  | 1 | 2 | 3 | 4 | 5 | 6 | 7 | 8 | 9 | 10 |
| Crafting Cost | 5 | 10 | 15 | 20 | 25 | 30 | 35 | 40 | 45 | 50 |

Fee Example:

Using the numbers in the Table above, imagine that a user wants to craft using a 5-slot template and has 3 materials: A (rarity 1), B (rarity 3), C (rarity 5). The Crafting Fee would be: Slot costs+Rarity Costs=(5+10+15)+(5+20+55)=100 Woodsies. Those materials are crafted or applied to the template. Later (e.g., in a different session), the user wants to add 2 more materials: D (rarity 8), E (rarity 6). Thus, the additional Crafting Fee would be: Slot costs+Rarity Costs=(20+25)+ (145+80)=270 Woodsies.

Figure 12:
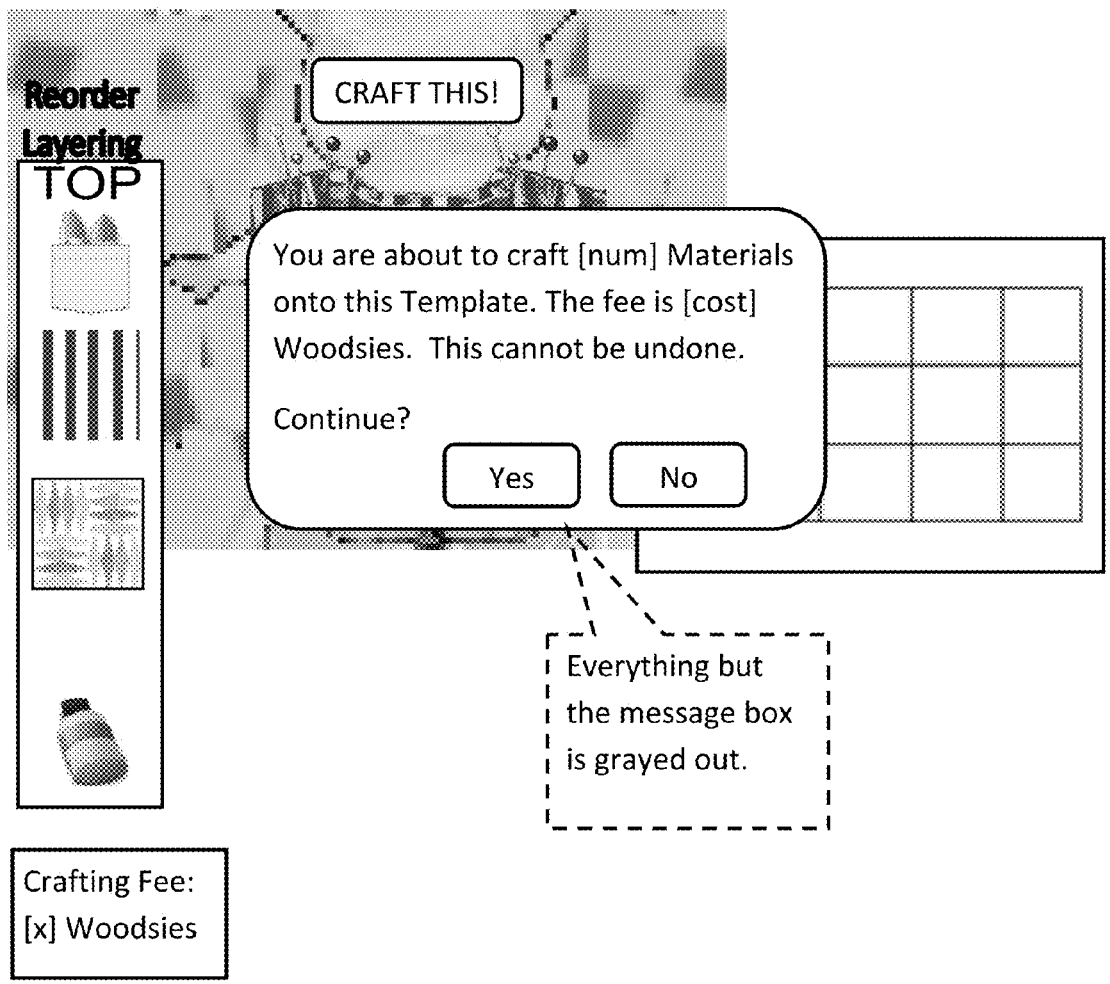
FIG. 12 is a schematic illustration of an exemplary graphical user interface employed in connection with the system of FIG. 1 or FIG. 2.

Once the "craft this" action is confirmed by the user, the crafting action cannot be undone and the materials cannot be removed from the template and used again. This confirms the analog to the real world, since in the real world, once material is colored, for example, it cannot be uncolored. Similarly, use of supplies typically exhausts those supplies, and they cannot be later used again. FIG. 12 illustrates a system message, reminding the user that the operation cannot be undone, once the materials are used.

The illustration in FIG. 13 depicts a preview of the crafted item along with information about the item—the materials used to create it, the quality rating, and number of slots it contains. If the template item no longer has any empty slots, it is considered (automatically) finished and becomes a Designer Item. That is, the user does not need to click on a "Finish" button (not shown).

Before an item is "finished", the user can modify or wear the template item. Finishing the template item means that the template item is fixed or locked and cannot have any more materials added to it (even if there are slots left). It is now referred to as a Designer Item in its name. Finished items include the user's signature which becomes a permanent part of the item and stays with the item even if it is sold or traded to other users. If there other slots open before the item is deemed finished, those slots cannot be filled after the item has been finished and signed.

Finished items cannot be altered; however, other "in-design"—that is, template items which are in the design process and have not been finished, can be altered via their respective alteration points.

The system 100 of FIG. 1 and system 200 of FIG. 2 can be separately integrated into or as a part of a computer system, which is employed to generate the virtual environment to be presented to a remotely-located user operating a computing device. The computer system includes an administrative server for managing a variety of administrative tasks. For example, the administrative server can validate registration information associated with physical products being registered by a user, the administration of user accounts, and other such administrative matters.

A web server can also be included as part of the computer system. The web server can host a website comprising the virtual environment as well as other features that are to appear within the virtual environment. The web server can serve content via a communication network to at least a first computing device (e.g., end-user) as well as a second computing device, each being remotely located from the web server and from each other. The administrative server and the web server can optionally be embodied by a single terminal. The communication network can include a wide area network ("WAN"), a local area network ("LAN"), or a combination thereof. For example, the web server may communicate with the first and second computing devices in a known manner using a TCP/IP protocol over the Internet, which is an illustrative embodiment of the communication network. One or both of the computing devices can optionally be connected to the Internet via an internal gateway, router, switch, and/or any other networking devices employed to achieve the Internet connection. In one embodiment, the web server can produce output over the network as an HTML webpage based on a request.

An exemplary architecture of the computer system, particularly the administrative and web servers that collectively operate to generate the virtual environment is described as follows. A non-transitory computer-readable medium such as a hard disk drive is operable as a storage component for storing data involved in maintaining the virtual environment and other content to be served to the computing devices via the communication network. The storage component may also store computer-executable instructions that, when executed by a computer processing unit, provide for the generation and management of the virtual environment as described above.

The foregoing description includes illustrative embodiments of various aspects of the subject system and/or method. It will be apparent to those skilled in the art that the above systems and methods may incorporate changes and modifications without departing from the general scope of this invention. It is intended to include all such modifications and alterations within the scope of the subject application. Furthermore, to the extent that the term "includes" is used in either the detailed description or the claims, such term is intended to be inclusive in a manner similar to the term "comprising" as interpreted when employed as a transitional word in a claim.

What is claimed is:

1. A computer system for crafting virtual items comprising:
   a server computer system that registers a non-virtual physical product via a computer network and produces outputs indicative of a virtual user character corresponding to the physical product, said virtual user character being assigned to a user account that is stored on a user computer;
   said server computer system distributes virtual items including a plurality of different item templates and a plurality of different virtual materials into a user storage associated with a selected user account for creating a customized virtual item on the server computer system, wherein the server computer system determines which of the plurality of different item templates and which of the plurality of different virtual materials to distribute to the user storage according to calculated probabilities based on a characteristic of the virtual user character assigned to the user account and the item templates and virtual materials are earned in response to activity performed by the virtual user independent of creating the customized virtual item, wherein the calculated probabilities are based on a combination of the non-virtual physical products registered to the user account; and said server computer system creating a customized virtual item in response to actions taken by the virtual user character received on the server computer system via the computer network, wherein the server computer system creates the customized virtual item by applying at least one of the plurality of virtual materials that is stored in the user storage to one of the plurality of different item templates that is stored in the user storage, wherein the templates and the virtual materials stored in the user storage are retrieved from the user storage for use during said creating of the customized virtual item and become unavailable for subsequent use after the templates and the virtual materials are used.

2. The computer system of claim 1 further comprising a marketplace database that receives the customized virtual item created by the server computer system, wherein the marketplace database enables the customized virtual item to be transferred to another user account in exchange for virtual currency or goods.

3. The computer system of claim 1, wherein in response to a finish request received by the server computer system via the computer network, the customized virtual item is locked so that no additional virtual materials can be applied.

4. The computer system of claim 3, wherein in response to the finish request, the server computer system applies information indicative of a signature of a creator of the customized virtual item, to the customized virtual item that identifies said creator.

5. The computer system of claim 1, wherein the server computer system assigns a unique identifier to the customized virtual item and stores the customized virtual item as a unique user-design object together with a plurality of other customized virtual items in a user-designed object database, and wherein the customized virtual item can be recreated by using the server computer system but is otherwise prevented from being copied.

6. The computer system of claim 1, wherein at least one of the plurality of virtual materials is offered for sale to users using the server computer system.

7. The computer system of claim 1, further comprising characteristics include at least one of a character type, character status and a skill level.

8. The computer system of claim 1, wherein said server computer system determines which of the plurality of different item templates and which of the plurality of different virtual materials to distribute to the user storage according to calculated probabilities based on a characteristic of the user account.

9. The computer system of claim 8, wherein a virtual user character having a higher skill level has a greater probability of being distributed a rarer or more valuable virtual item than a user character having a lower skill level.

10. The computer system of claim 1, wherein the virtual user character generated by the server computer system has an appearance that resembles the physical product that was registered.

11. The computer system of claim 1, wherein the item template indicates a free-form item in which the plurality of virtual crafting items are combined or arranged without limitations comprising at least one of predetermined item shape, predetermined item size, predetermined item portions, predetermined item sections, predetermined alteration points, and placement of one or more virtual crafting materials.

12. The computer system of claim 11, wherein the free-form item is programmable by the user to perform an action or function.

13. The computer system of claim 1, wherein the virtual items are supplied by the system.

14. A computer system for crafting virtual items comprising:

a server computer system that registers a non-virtual physical product via a computer network and generates a virtual user character corresponding to the physical product, said virtual user character being assigned to a user account;

said server computer system distributes virtual items and templates into user storage associated with the user account and where the virtual materials and templates have been earned in response to activity by the virtual user character, wherein the virtual items and templates are distributed to the user storage according to calculated probabilities based on a characteristic of the virtual user character assigned to the user account and the item templates and virtual materials are earned in response to activity performed by the virtual user independent of creating the customized virtual item, wherein the calculated probabilities are based on a combination of the non-virtual physical products registered to the user account; and said server computer system controlling creation of a customized virtual item based on actions taken by the virtual user character received via the computer network, wherein based on the user input, the server computer system creates the customized virtual item by combining two or more of said virtual items and a template that are stored in the user storage, wherein the two or more of said virtual items and the template are unavailable for subsequent use to make additional customized virtual items after being used to make the customized virtual item, and wherein in response to a finish request received by the server computer system via the computer network, the server computer system locks the customized virtual item so that no additional virtual items can be added.

15. The computer system of claim 14, wherein the virtual items stored in the user storage include a plurality of different item templates and a plurality of different virtual materials, and wherein the server computer system creates the customized virtual item, in response to the user input, by applying at least one of the plurality of virtual materials that is stored in the user storage to one of the plurality of different item templates that is stored in the user storage.

16. The computer system of claim 14, wherein in response to the finish request, the server computer system applies information indicative of a signature of a creator of the customized virtual item to the customized virtual item that identifies the user account or user character associated with the creation of the customized virtual item.

17. The computer system of claim 14, wherein at least one of the plurality of virtual materials is offered for sale to users using the server computer system.

18. The computer system of claim 14, wherein the server computer system determines which of the virtual items to distribute to the user storage according to probabilities based on a characteristic of the virtual user character assigned to the user account.

19. The computer system of claim 14, wherein the virtual user character generated by the server computer system has an appearance that resembles the physical product that was registered.

20. The computer system of claim 14, wherein the customized virtual item comprises a free-form item in which the plurality of virtual items are combined or arranged without limitations comprising at least one of predetermined item shape, predetermined item size, predetermined item portions, predetermined item sections, predetermined alteration points, and placement of one or more virtual crafting materials.

21. The computer system of claim 20, wherein the free-form item is programmable by the user to perform an action or function.

22. A method for crafting virtual items comprising:
registering a non-virtual physical product on a server computer system via a computer network and generating a virtual user character corresponding to the physical product, said virtual user character being assigned to a user account;
distributing virtual items including a plurality of different item templates and a plurality of different virtual materials into user storage associated with the user account for making customized virtual items, wherein the server computer system determines which of the plurality of different item templates and which the plurality of different virtual materials to distribute to the user storage according to calculated probabilities based on a characteristic of the virtual user character assigned to the user account and the item templates and virtual materials are earned in response to activity performed by the virtual user independent of creating the customized virtual item, wherein the calculated probabilities are based on a combination of the non-virtual physical products registered to the user account; and
creating a customized virtual item based on actions taken by the virtual user character received on the server computer system via the computer network, wherein the server computer system creates the customized virtual item by applying at least one of the plurality of virtual materials that is stored in the user storage to one of the plurality of different item templates that is stored in the user storage, wherein the templates and the virtual materials stored in the user storage become unavailable for subsequent use after the templates and the virtual materials are used.

23. The method of claim 22 further comprising enabling the customized virtual item to be transferred to another user account in exchange for virtual currency or goods.

24. The method of claim 22, further comprising, in response to a finish request received by the server computer system via the computer network, locking the customized virtual item so that no additional virtual materials can be applied.

25. The method of claim 24, further comprising, in response to the finish request, applying a digital signature to the customized virtual item that identifies the user account or virtual user character associated with the creating the customized virtual item.

26. The method of claim 22, further comprising, assigning a unique identifier to the customized virtual item and storing the customized virtual item as a unique user-design object together with a plurality of other customized virtual items in a user-designed object database, and wherein the customized virtual item can be recreated by using the server computer system but is otherwise prevented from being copied.

27. The method of claim 22, further comprising offering at least one of the plurality of virtual materials for sale to users.

28. The method of claim 22, wherein the characteristics include at least one of a character type, character status and a skill level.

29. The method of claim 22, wherein a virtual user character having a higher skill level has a greater probability of being distributed a rarer or more valuable virtual item than a user character having a lower skill level.

30. The method of claim 22, wherein the virtual user character generated in the step of registering has an appearance that resembles the physical product that was registered.

31. The method of claim 22, wherein the item template indicates a free-form item in which the plurality of virtual crafting items are combined or arranged without limitations comprising at least one of predetermined item shape, predetermined item size, predetermined item portions, predetermined item sections, predetermined alteration points, and placement of one or more virtual crafting materials.

32. The computer system of claim 31, wherein the free-form item is programmable by the user to perform an action or function.

33. A method for crafting virtual items comprising:
registering a non-virtual physical product on a server computer system via a computer network and generating a virtual user character corresponding to the physical product, said virtual user character being assigned to a user account;
distributing virtual items into user storage associated with the user account based on activity performed by the virtual user character in a virtual environment independent of creating a customized virtual item, wherein the virtual items comprise at least one template and two or more virtual materials and the virtual items are distributed according to calculated probabilities based on a characteristic of the virtual user character assigned to the user account and are earned in response to activity performed by the virtual user independent of creating the customized virtual item, wherein the calculated probabilities are based on a combination of non-virtual physical products registered to the user account;
creating a customized virtual item based on actions taken by the virtual user character received on the server computer system via the computer network, wherein the server computer system creates the customized virtual item by combining two or more virtual materials that are stored in the user storage, and after the two or more virtual items and the at least one template are used one time each to create the customized virtual item, the two virtual items and template are removed from the user storage and become unavailable for subsequent use after the templates and the virtual items are used, wherein the customized virtual item comprises clothing, accessories, shoes, home furnishings, and art; and
in response to a finish request received by the server computer system via the computer network, locking the customized virtual item so that no additional virtual materials can be added.

34. The method of claim 33, wherein the virtual items stored in the user storage include a plurality of different item templates and a plurality of different virtual materials, and wherein the customized virtual item is created, in response to the user input, by applying at least one of the plurality of virtual materials that is stored in the user storage to one of the plurality of different item templates that is stored in the user storage.

35. The method of claim 34, further comprising offering at least one of the plurality of virtual materials for sale to users.

36. The method of claim 33, further comprising, in response to the finish request, applying a digital signature to the customized virtual item that identifies the user account or virtual user character associated with the creating the customized virtual item.

37. The method of claim 33, wherein, in the step of distributing, the server computer system determines which of the virtual items to distribute to the user storage according to probabilities based on a characteristic of the virtual user character assigned to the user account.

38. The method of claim 33, wherein the virtual user character generated in the step of registering has an appearance that resembles the physical product that was registered.

39. The method of claim 33, wherein the customized virtual item comprises a free-form item in which the plurality of virtual items are combined or arranged without limitations comprising at least one of predetermined item shape, predetermined item size, predetermined item portions, predetermined item sections, predetermined alteration points, and placement of one or more virtual crafting materials.

40. The method of claim 39, wherein the free-form item is programmable by the user to perform an action or function.

* * * * *